United States Patent
Maeda et al.

(10) Patent No.: US 7,734,180 B2
(45) Date of Patent: Jun. 8, 2010

(54) SINGLE FIBRE BIDIRECTIONAL OPTICAL TRANSMISSION SYSTEM AND SINGLE FIBRE BIDIRECTIONAL OPTICAL AMPLIFIER

(75) Inventors: Wakako Maeda, Tokyo (JP); Akio Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 726 days.

(21) Appl. No.: 10/844,513

(22) Filed: May 13, 2004

(65) Prior Publication Data

US 2004/0228632 A1 Nov. 18, 2004

(30) Foreign Application Priority Data

May 14, 2003 (JP) .............................. 2003-135224

(51) Int. Cl.
H04J 14/02 (2006.01)
H04B 10/12 (2006.01)

(52) U.S. Cl. .............................. 398/79; 398/42; 398/81; 398/97; 398/157; 398/173; 359/341.2; 359/349

(58) Field of Classification Search ...................... 398/1, 398/66–97, 177, 180; 359/124, 341.2, 344; 385/24

See application file for complete search history.

(56) References Cited

U.S. PATENT DOCUMENTS

| | | | | |
|---|---|---|---|---|
| 5,452,124 | A * | 9/1995 | Baker | 359/341.2 |
| 5,926,590 | A * | 7/1999 | Mao | 385/24 |
| 6,018,404 | A * | 1/2000 | Meli et al. | 398/1 |
| 6,101,016 | A * | 8/2000 | Roberts et al. | 398/97 |
| 2001/0028757 | A1* | 10/2001 | Lee et al. | 385/24 |
| 2001/0038478 | A1* | 11/2001 | Hwang | 359/124 |
| 2002/0089719 | A1* | 7/2002 | Joo et al. | 359/124 |
| 2002/0141046 | A1* | 10/2002 | Joo et al. | 359/341.2 |
| 2004/0042067 | A1* | 3/2004 | Eiselt | 359/344 |

FOREIGN PATENT DOCUMENTS

| | | | |
|---|---|---|---|
| JP | H03-092827 | A | 4/1991 |
| JP | 4-186933 | A | 7/1992 |
| JP | 6-342952 | A | 12/1994 |
| JP | H06-342950 | B2 | 12/1994 |
| JP | 8-265272 | A | 10/1996 |
| JP | 8-265299 | A | 10/1996 |

(Continued)

*Primary Examiner*—Li Liu
(74) *Attorney, Agent, or Firm*—Sughrue Mion, PLLC

(57) ABSTRACT

The present invention provides a single fiber bidirectional optical transmission system capable of realizing the extension of a single fiber bidirectional long distance at a moderate price.

An optical signal outputted from a second optical transmitter is incident on an optical amplifying portion passing through an optical circulator, a single fiber bidirectional transmission path, an optical circulator and an optical Blue/Red filter. The optical signal outputted from a first optical transmitter is incident on the optical amplifying portion passing through a dispersion compensator and the optical Blue/Red filter. By inserting the dispersion compensator immediately after the first optical transmitter, a difference between a power level by which the optical signal from the first transmitter is inputted to the optical amplifier and the power level by which the optical signal from the second optical transmitter is inputted to the optical amplifier is made small, so that, even when the optical amplifier is installed at one end of the transmission path, both of the bidirectional signals can obtain sufficient gains, thereby realizing a bidirectional collective amplification.

16 Claims, 16 Drawing Sheets

FOREIGN PATENT DOCUMENTS

| | | |
|---|---|---|
| JP | 10-22917 A | 1/1998 |
| JP | 11-127121 A | 5/1999 |
| JP | 11-284576 A | 10/1999 |
| JP | H11-274625 A | 10/1999 |
| JP | 2002-118313 A | 4/2002 |
| JP | 2002-319902 A | 10/2002 |

* cited by examiner

SINGLE FIBRE BIDIRECTIONAL OPTICAL TRANSMISSION SYSTEM AND SINGLE FIBRE BIDIRECTIONAL OPTICAL AMPLIFIER

BACKGROUND OF THE INVENTION

1. Field of the Invention

The present invention relates to a single fibre bidirectional optical transmission system and a single fibre bidirectional optical amplifier, and more in particular, it relates to a single fibre bidirectional optical amplifier for performing the collective amplification of a bidirectional optical signal by an optical amplifier in a single fibre bidirectional optical transmission to perform a bidirectional transmission by a single optical fibre.

2. Description of the Related Art

In a single fibre bidirectional optical transmission technology for performing a bidirectional transmission by one piece of an optical fibre, comparing to a two fibre bidirectional transmission in which two pieces of fibres perform single directional transmission, respectively, the number of optical fibres to be used is reduced one half. Hence, when the optical fibres are to be newly laid down, the lying fibres is reduced one half, and when dark fibres are used, the fibre charges are reduced one half. Consequently, it is possible to construct an economical system.

In optical communications, in order to realize a long distance transmission, an optical amplifier is used to amplify an optical signal attenuated due to a transmission path loss as it is as a light beam without performing an optic-electric (O/E) conversion and an electric-optic (E/O) conversion. The optical amplifier is characterized in that it does not depend on a bit rate and a signal format and is capable of collectively amplifying a wavelength multiplexing signal and, therefore, it is possible to realize a flexible and low cost network.

In general, as for the optical amplifier, an erbium doped fibre amplifier for entering an excited light together with a signal beam into the erbium doped fibre and amplifying the signal beam is used. This optical amplifier is manufactured in such a way as to amplify the light beam transmitting single direction, and its configuration is not so complicated. For this reason, the optical amplifier cannot be simply inserted into a single fibre bidirectional transmission path in which the optical signal is transmitted bidirectional in the single optical fibre.

Hence, though the configuration is complicated, various techniques have been proposed as the single fibre bidirectional transmission optical amplifier. For example, as shown in FIG. 17, there is a method available, in which signals 252, 262, 272 and 282 advancing up and down into different directions, respectively in single fibre bidirectional transmission paths 84 and 89 are separated by optical circulators 83, 85, 88 and 90, and are amplified separately up and down, respectively, by using conventional optical amplifiers 86 and 87, and after that, are multiplexed again by the circulators 83, 85, 88 and 90.

At this time, in the optical amplifiers 86 and 87, there is required an optical multiplexer for multiplexing the excited light and the signal beam. Further, in order to separate the signals 252, 262, 272 and 282 up and down in the single fibre bidirectional transmission paths 84 and 89, there is required an optical demultiplexer. There has been proposed a technique for commonly using the optical multiplexer and the optical demultiplexer by the optical circulator having four ports (for example, refer to patent document 1).

Further, there has been also proposed a configuration (for example, refer to patent document 2), in which the common use of the optical multiplexer and the optical demultiplexer is attempted by using a reflector when the excited light and the signal beam in the optical amplifier are multiplexed, or the configuration similar to this (for example, refer to patent document 3).

On the other hand, as for the method for amplifying the up and down optical signals without separating them, there is also available a technique, in which the erbium doped fibre is connected to a bidirectional transmission path so as to add the excited light bidirectional up and down, thereby amplifying the up and down optical signals in bidirection (for example, refer to patent document 4).

[Patent Document 1]
Japanese Patent Laid-Open No. 6-342950 (Pages 4 to 6, FIG. 1)
[Patent Document 2]
Japanese Patent Laid-Open No. 11-274625 (Pages 7 and 8, FIG. 1)
[Patent Document 3]
Japanese Patent Laid-Open No. 2002-118313 (Pages 5 and 6, FIG. 1)
[Patent Document 4]
Japanese Patent Laid-Open No. 3-92827 (Page 161, lower right column, Page 162, upper left column, FIG. 6)

When an optical communication system aims specially at a metropolitan area, it places the first priority on the cost, and it is desirable to use low cost products. According to the technique in which the up and down optical signals are separated and separately amplified respectively similarly as described in the patent documents 1, 2 and 3, two sets of the optical amplifiers are required up and down among the conventional single fibre bidirectional optical amplifiers. This makes the cost expensive and the device size large, and causes a problem in that the consumption power becomes large and the like.

Further, according to this technique, by combining the separation of the up and down signals of the bidirectional transmission and the multiplexing of the signal beam with the excited light of the optical amplifier, the optical multiplexing and demultiplexing elements are commonly used. Therefore, it is necessary to newly develop an element for exclusive use of the single fibre bidirectional optical amplifier, and this causes a problem in that the cost becomes expensive.

On the other hand, as for the technique for amplifying the optical signal without separating up and down optical signal, though there is a technique disclosed in the patent document 4, it is indispensable for the optical amplifier to insert an optical isolator so that an oscillation does not build up in the interior of the optical amplifier by a reflection occurred at a connecting point of the erbium doped fibre and the transmission path and in the transmission path. Consequently, there arises a problem in that such a configuration is not possible to realize.

Further, according to the conventional single fibre bidirectional optical amplifier, a vertically symmetrical transmission path is conceived so that the up and down optical signal is equally amplified. Thus, the optical amplifier has to be installed in the center of the single fibre bidirectional transmission path, and consequently, there is a problem in that an installing condition is limited.

Further, a transmission distance goes beyond 60 km, and in the case where the transmission rate is not less than 10 Gbps per one wavelength, not only an optical amplification, but also a dispersion compensation is required. However, there is a problem in that no consideration has been given to this so far.

Hence, the object of the present invention is to solve the above-described problems and to provide a single fibre bidirectional optical transmission system and a single fibre bidirectional optical amplifier which can attempt the extension of a single fibre bidirectional long distance at a moderate price.

BRIEF SUMMARY OF THE INVENTION

The single fibre bidirectional optical transmission system according to the present invention is a single fibre bidirectional optical transmission system for multiplexing a plurality of optical signals of different wavelengths and performing a bidirectional transmission between a first optical terminal and a second optical terminal through a single fibre bidirectional transmission path, and comprises an optical amplifier for collectively amplifying bidirectional wavelength multiplexing optical signals.

The single fibre bidirectional optical amplifier according to the present invention is a single fibre bidirectional optical amplifier used for the single fibre bidirectional optical transmission system for multiplexing a plurality of optical signals of different wavelengths and performing the bidirectional transmission between the first optical terminal and the second optical terminal through the single fibre bidirectional transmission path, and comprises an optical amplifier for collectively amplifying bidirectional wavelength multiplexing optical signals.

That is, a first single fibre bidirectional optical transmission system of the present invention is characterized in that, in order to realize the above-described object, the single fibre bidirectional optical transmission system for multiplexing a plurality of optical signals of different wavelengths and performing the bidirectional transmission between the first optical terminal and the second optical terminal through the single fibre bidirectional transmission path collectively amplifies bidirectional wavelength multiplexing optical signals by an optical amplifier.

A second single fibre bidirectional optical transmission system of the present invention is characterized in that the optical amplifier is equipped only for the first optical terminal or the second optical terminal in the above-described single fibre bidirectional optical transmission system.

A third single fibre bidirectional optical transmission system of the present invention is characterized in that the wavelength multiplexing beams transmitting through the single fibre bidirectional transmission path are separated by a directional separator for every direction in the above described first optical terminal and the second optical terminal.

A fourth single fibre bidirectional optical transmission system of the present invention is characterized in that the above-described directional separator is any one of an optical circulator, an optical Blue/Red filter, and an optical interleaver.

A fifth single fibre bidirectional optical transmission system of the present invention is characterized in that the above-described optical amplifier comprises an optical amplifier portion, an optical multiplexer and a first optical dispersion compensator placed at the input side of the optical amplifier portion, an optical demultiplexer and a second optical dispersion compensator placed at the output side of the optical amplifier portion, and the first optical dispersion compensator is connected to an optical transmitter and the optical multiplexer in the first or second optical terminal equipped with the optical amplifier, and the second dispersion compensator is connected to the optical receiver and the optical demultiplexer in the first or second optical terminal equipped with the optical amplifier, and the optical signal outputted from the optical transmitter and having passed through the first dispersion compensator and the optical signal having propagated the single fibre bidirectional transmission path are multiplexed and collectively amplified, and after that, are demultiplexed into the signal to be outputted to an optical receiver through the second dispersion compensator and the signal to be outputted to the single fibre bidirectional transmission path.

A sixth single fibre bidirectional optical transmission system of the present invention is characterized in that the above-described optical multiplexer and optical demultiplexer are any one of the optical Blue/Red filter and the optical interleaver.

A seventh single fibre bidirectional optical transmission system of the present invention is characterized in that the optical amplifier in the above-described single fibre bidirectional optical transmission system comprises an optical amplifier portion, an optical multiplexers placed at the input side of the optical amplifying portion, an optical demultiplexer placed at the output side of the optical amplifier portion, an optical dispersion compensator and an optical directional separators placed at both ends of the optical dispersion compensator, wherein the optical signal outputted from the optical transmitter in the first or second optical terminal equipped with the optical amplifier and the optical signal having propagated the single fibre bidirectional transmission path are multiplexed and collectively dispersion compensated and collectively amplified, and after that, are demultiplexed and are outputted to the optical receiver in the first or second optical terminal for which the optical amplifier is equipped and to the single fibre bidirectional transmission path.

An eighth single fibre bidirectional optical transmission system of the present invention is characterized in that the above-described optical multiplexer and the optical demultiplexer are any one of the optical Blue/Red filter and the optical interleaver.

A ninth single fibre bidirectional optical transmission system of the present invention is characterized in that the above-described optical directional separator is any one of the optical circulator, the optical Blue/Red filter and the optical interleaver.

The ninth single fibre bidirectional optical transmission system of the present invention is characterized in that the above-described optical amplifier is equipped in the center of the transmission path.

As described above, the present invention inserts the optical amplifier into either one end of the single fibre bidirectional transmission path, and realizes the single fibre bidirectional optical amplifier for collectively amplifying the bidirectional optical signal by an optical amplifier.

DETAILED DESCRIPTION OF THE PREFERRED EMBODIMENTS

Figure 1:
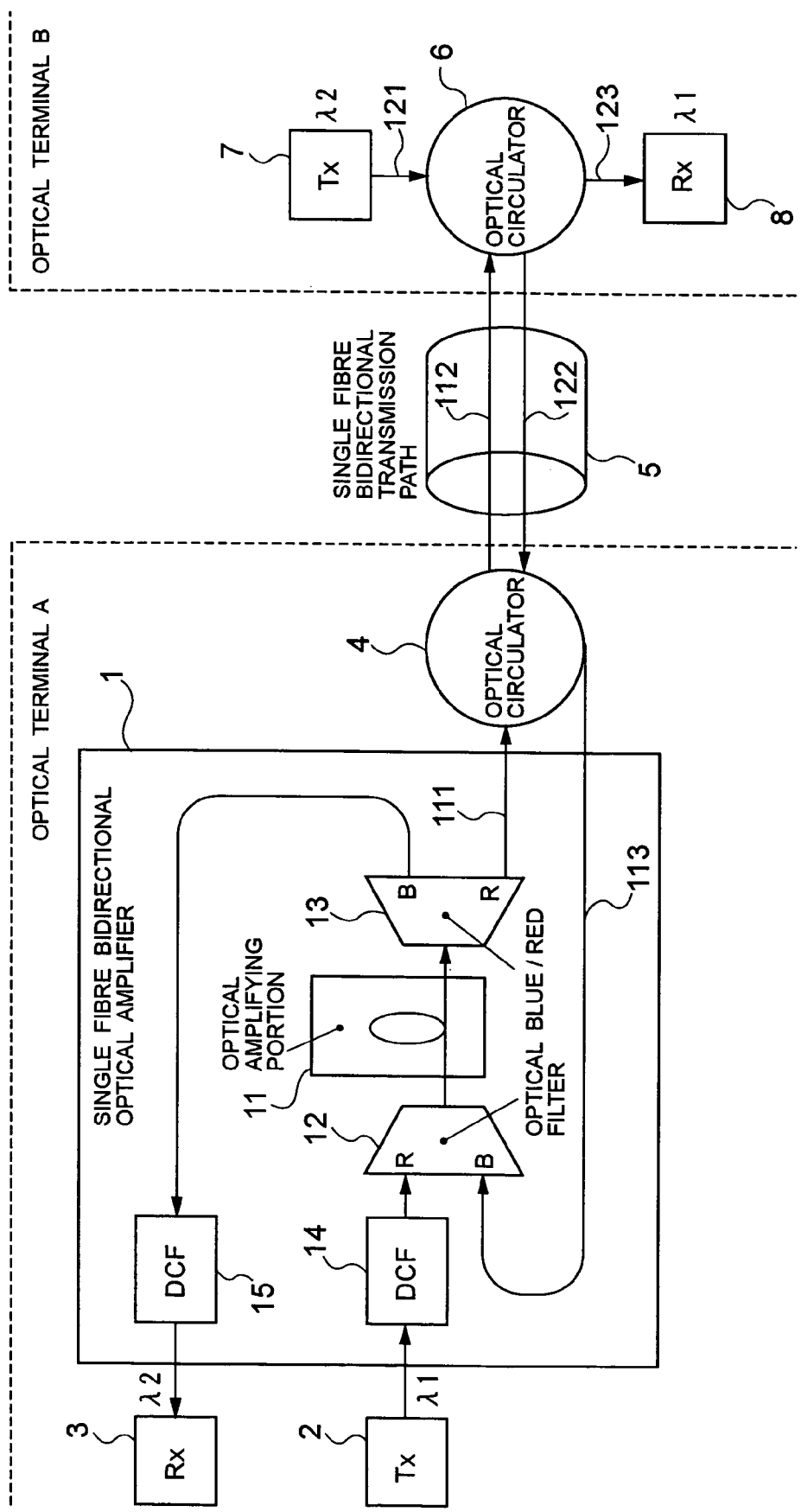
FIG. 1 is a block diagram showing the configuration of a single fibre bidirectional optical transmission system according to a first embodiment of the present invention.

Next, embodiments of the present invention will be described with reference to the drawings. FIG. 1 is a block diagram showing the configuration of a single fibre bidirectional optical transmission system according to a first embodiment of the present invention. In FIG. 1, one optical terminal A of a transmission path is configured by a single fibre bidirectional optical amplifier 1, a first optical transmitter (Tx) 2, and a first optical receiver (Rx) 3, and is connected to a single fibre bidirectional transmission path 5 through an optical circulator 4.

The other optical terminal B of the transmission path is configured by a second optical transmitter (Tx) 7 and a second optical receiver (Rx) 8, and is connected to the single fibre bidirectional transmission path 5 with a single-mode fibre through an optical circulator 6.

The single fibre bidirectional optical amplifier 1 comprises an optical amplifying portion 11 (for example, erbium doped fibre amplifying portion), an optical Blue/Red filter 12 immediately before the optical amplifying portion 11, and an optical Blue/Red filter 13 immediately after the optical amplifying portion 11. Dispersion compensators (DCF) 14 and 15 are inserted between the optical Blue/Red filter 12 and a first optical transmitter 2 and between the optical Blue/Red filter 13 and a first optical receiver 3, respectively.

Figure 2:
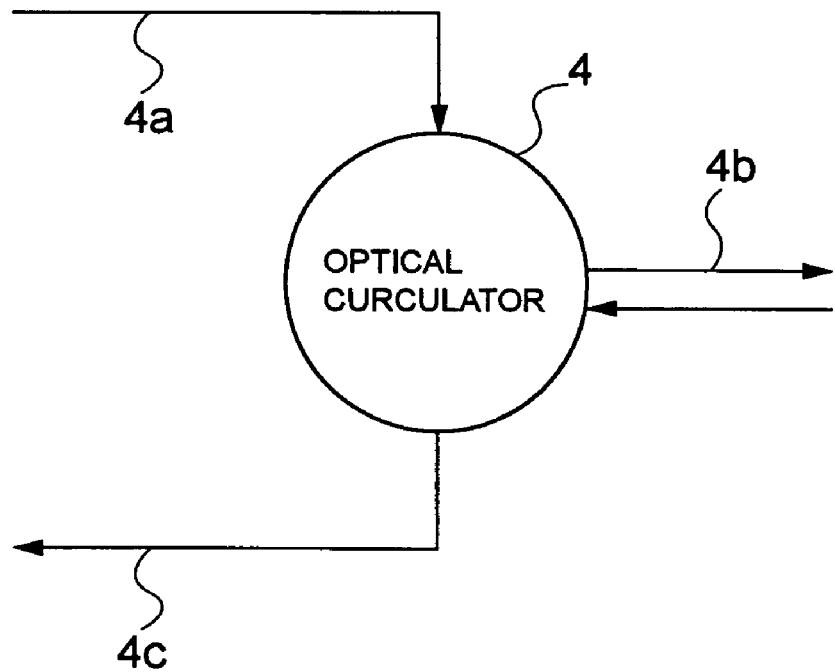
FIG. 2 is a view showing an optical circulator of FIG. 1.

FIG. 2 is a view showing the optical circulator 4 of FIG. 1. In FIG. 2, the optical circulator 4 is an element for performing multiplexing or demultiplexing by the direction of an optical signal. An insertion loss from a port 4a to a port 4b is 1 dB, and an isolation from the port 4a to a port 4c is not less than 40 dB. Hence, a light beam from the port 4a transmits the port 4b only, and does not transmit to the port 4c.

Similarly, the insertion loss from the port 4b to the port 4c is 1 dB, and the isolation from the port 4b to the port 4a is not less than 40 dB. Hence, the optical signal from the port 4b transmits the port 4c only, and does not advance to the port 4a. In this way, a bidirectional transmission is performed at the port 4b side, and a single directional transmission is performed at the port 4a and 4c side. Although not illustrated, the same is applied to an optical circulator 6 similarly with the optical circulator 4.

Figure 3:
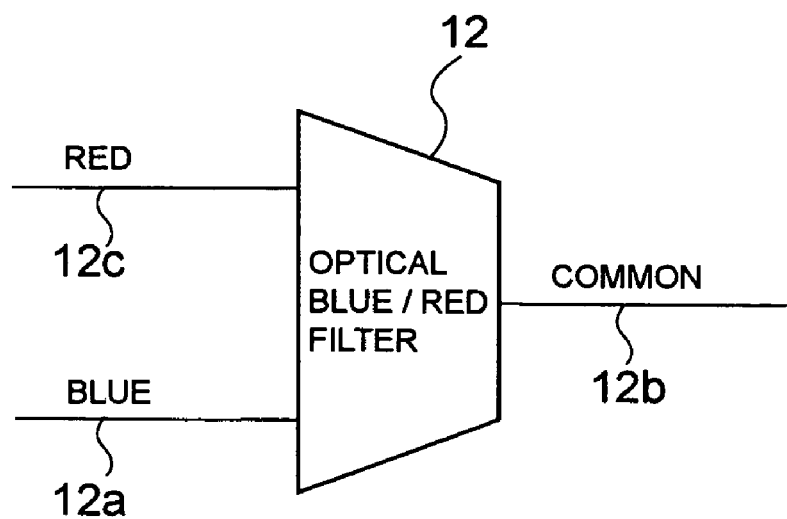
FIG. 3 is a view showing an optical Blue/Red filter of FIG. 1.
Figure 4:
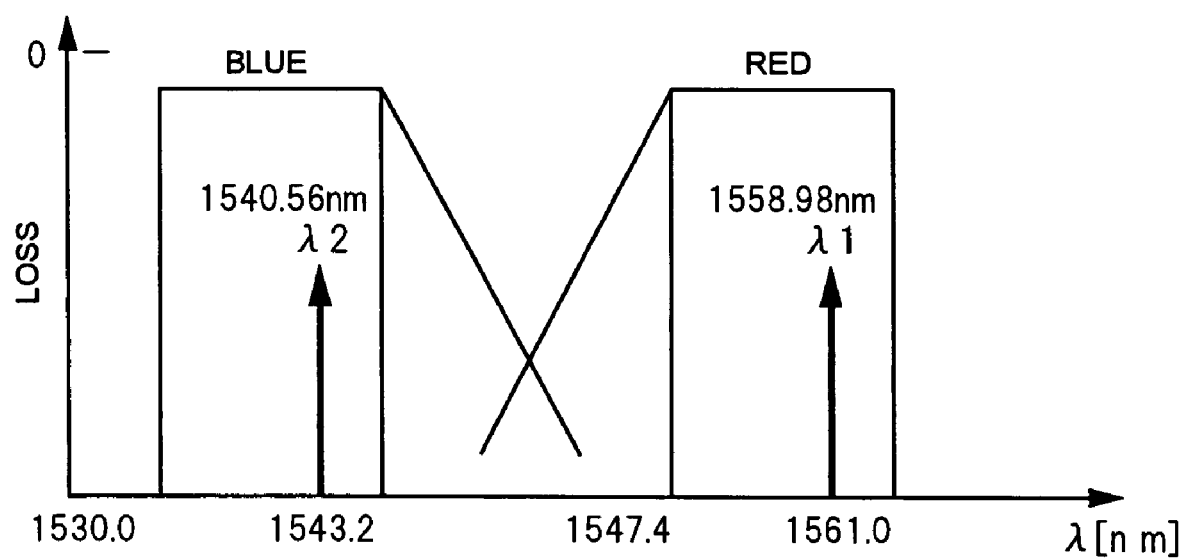
FIG. 4 is a view showing a characteristic of the optical Blue/Red filter.

FIG. 3 is a view showing the optical Blue/Red filter 12 of FIG. 1, and FIG. 4 is a view showing the characteristic of the optical Blue/Red filter. The optical Blue/Red filter 12 is the element for performing the multiplexing and demultiplexing of the light beam by a waveband of the optical signal. A port 12a, a port 12b, a port 12c are taken as a Blue port, a Common port and a Red port, respectively.

The transmission characteristics of the Blue port 12a and the Red port 12c are as shown in FIG. 4, respectively. The insertion loss with the Blue port 12a and the Common port 12b, or the insertion loss with the Red port 12c and the Common port 12b is 1 dB in either case, and the isolation with the Blue port 12a and the Red port 12c is not less than 30 dB.

Further, a pass band of the Blue port 12a and the Red port 12c is 1530.0 to 1543.2 nm and 1547.4 to 1561.0 nm, respectively. The Blue port 12a and the Red port 12c transmit only the signal of the wavelength inside the pass band, and the Common port 12b transmits the signal irrespective of the wavelength of the optical signal, thereby performing the multiplexing and demultiplexing by the waveband.

Assuming that the optical signal from the first optical transmitter 2 is taken as 10 Gbps in transmission speed, as 1558.98 nm in a wavelength $\lambda 1$, and the optical signal from the second optical transmitter 7 is taken as 10 Gbps in transmission speed, as 1540.56 nm in a wavelength $\lambda 2$, since the optical signal of the wavelength $\lambda 1$ transmits the Red port 12c only, and the optical signal of the wavelength $\lambda 2$ transmits the Blue port 12a only, the multiplexing and demultiplexing by the wavelength is performed at the optical Blue/Red filter 12. Although not illustrated, the same is applied to the optical Blue/Red filter 13 similarly with the optical Blue/Red filter 12.

Although the optical amplifier 11 gives a gain equal to the optical signal of each channel of WDM (Wavelength Division Multiplexing) signal having an input level of −30 to −15 dBm/ch and a wavelength range of 1535.11 to 1559.48 nm, the level difference between the channels of a plurality of input signals are large, and when the power level comes to be out of the range of −30 to −15 dBm, there are often the cases where the power level reaches a gain saturation region so that the output level becomes constant and a sufficient gain is not obtained or a fluctuation of the gain arises by the channel in the WDM signal. Hence, it is better for the difference in the level of the optical signal of each channel at WDM signal to be small.

In the single fibre bidirectional optical amplifier 1 according to the present embodiment, by inserting the dispersion compensator 14 immediately after the first optical transmitter 2, the difference between the power level at which the optical signal from the first optical transmitter 2 is inputted to the optical amplifying portion 11 and the power level at which the optical signal from the second optical transmitter 7 is inputted to the optical amplifier 11 is allowed to be small.

The optical signal outputted from the second optical transmitter 7 passes through the optical circulator 6, the single fibre bidirectional transmission path 5, the optical circulator 4 and the optical Blue/Red filter 12, and is incident on the optical amplifying portion 11. Assuming that the loss of the single fibre bidirectional transmission path 5 is taken as 0.25 dB/km, and a distance as 80 km, the optical signal outputted from the second transmitter 7 receives a total loss of 23 dB until immediately before being incident on the optical amplifying portion 11.

On the other hand, the optical signal outputted from the first optical transmitter 2 passes through the dispersion compensator 14 and the optical Blue/Red filter 12, and is incident on the optical amplifying portion 11. At this time, assuming that the amount of dispersion compensation is taken as −1360 ps/nm which is a dispersion at the time of the transmission of 80 km, and the loss as 10 dB, a total loss, which the optical signal outputted from the first transmitter 2 receives until immediately before being incident on the optical amplifying portion 11, is 11 dB.

In this way, when the output of the first optical transmitter 2 and the output of the second optical transmitter 7 are concurrently taken as −5 dBm, the power level of the optical signal when the optical signal is incident on the optical amplifying portion 11 becomes −16 dBm and −28 dBm, respectively, and the difference in the power level is 12 dB. Thus, it is in the range where the gain of the bidirectional up and down can be sufficiently secured.

Further, when the gain of the optical amplifying portion 11 is taken as 25 dB, since the powers at the first optical receiver 3 and the second optical receiver 8 become −14 dBm and exceeds −18 dBm, which is the receiving sensitivity of an optical IF (interface) of 10 Gps, there arises no problem.

Further, since the input from the optical circulator 4 to the single fibre bidirectional transmission path 5 is 7 dBm, there is also no problem for the influence of a nonlinear optical effect. As described above, by using the single fibre bidirectional optical amplifier 1 according to the first embodiment of the present invention, the single fibre bidirectional transmission of 10 Gbps and 80 km can be realized.

Figure 5:
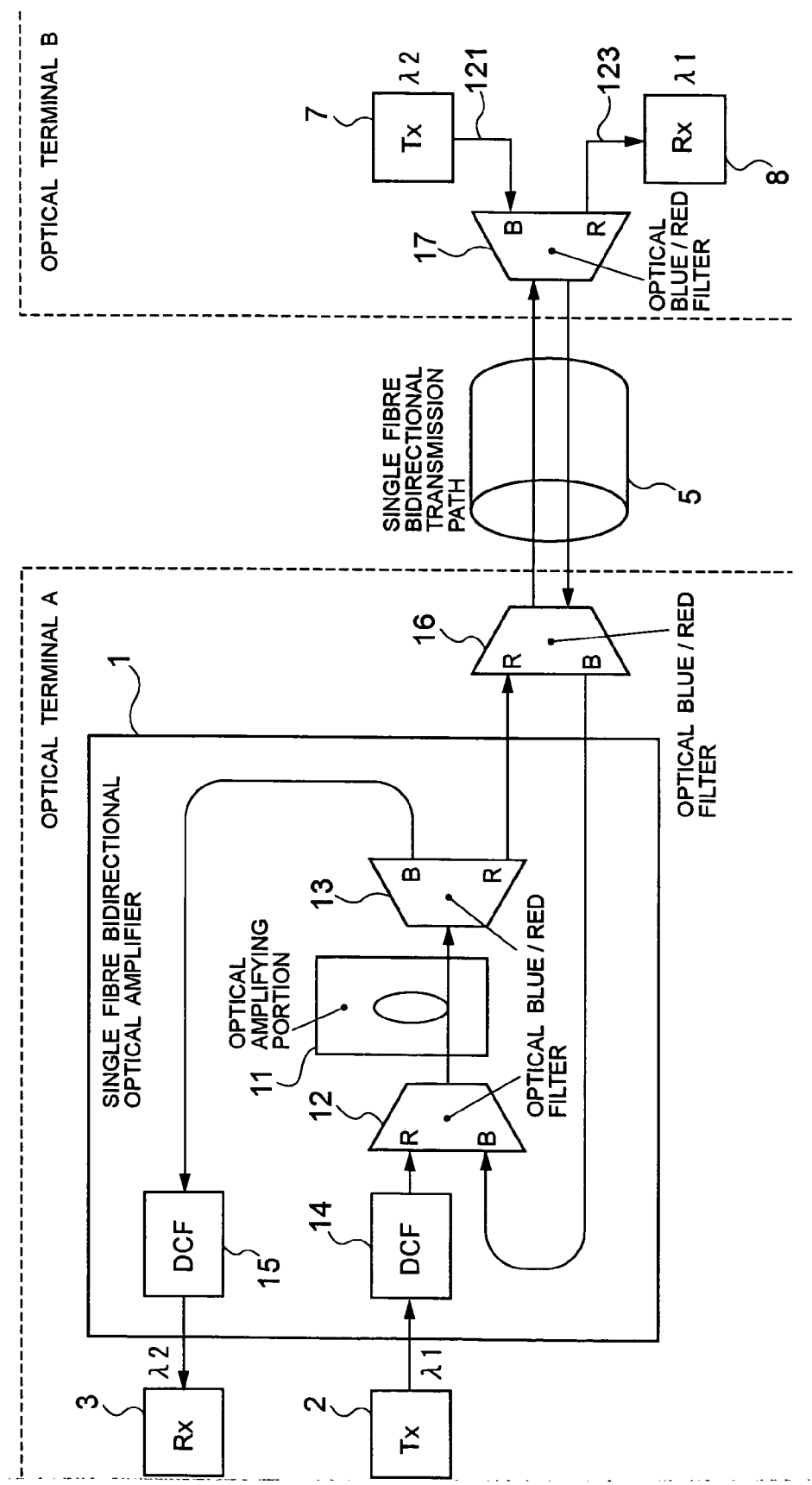
FIG. 5 is a block diagram showing the configuration of a single fibre bidirectional optical transmission system according to a second embodiment of the present invention.

FIG. 5 is a block diagram showing the configuration of a single fibre bidirectional optical transmission system according to a second embodiment of the present invention. In FIG. 5, the single fibre bidirectional optical transmission system according to the second embodiment of the present invention has the same configuration as that of the first embodiment of the present invention as shown in FIG. 1 except that the system is configured such that the optical circulators 4 and 6 are replaced by the optical Blue/Red filters 16 and 17, thereby multiplexing and demultiplexing the up and down optical signals. Further, the operation of the same component is the same as that of the first embodiment of the present invention.

The optical Blue/Red filters 16 and 17 are the pass bands having the same wavelength as that of the optical Blue/Red filters 12 and 13. In this way, in the second embodiment of the present invention, similarly with the above-described first embodiment of the present invention, the single fibre bidirectional transmission of 10 Gbps and 80 km can be realized by using the single fibre bidirectional amplifier 1.

Figure 6:
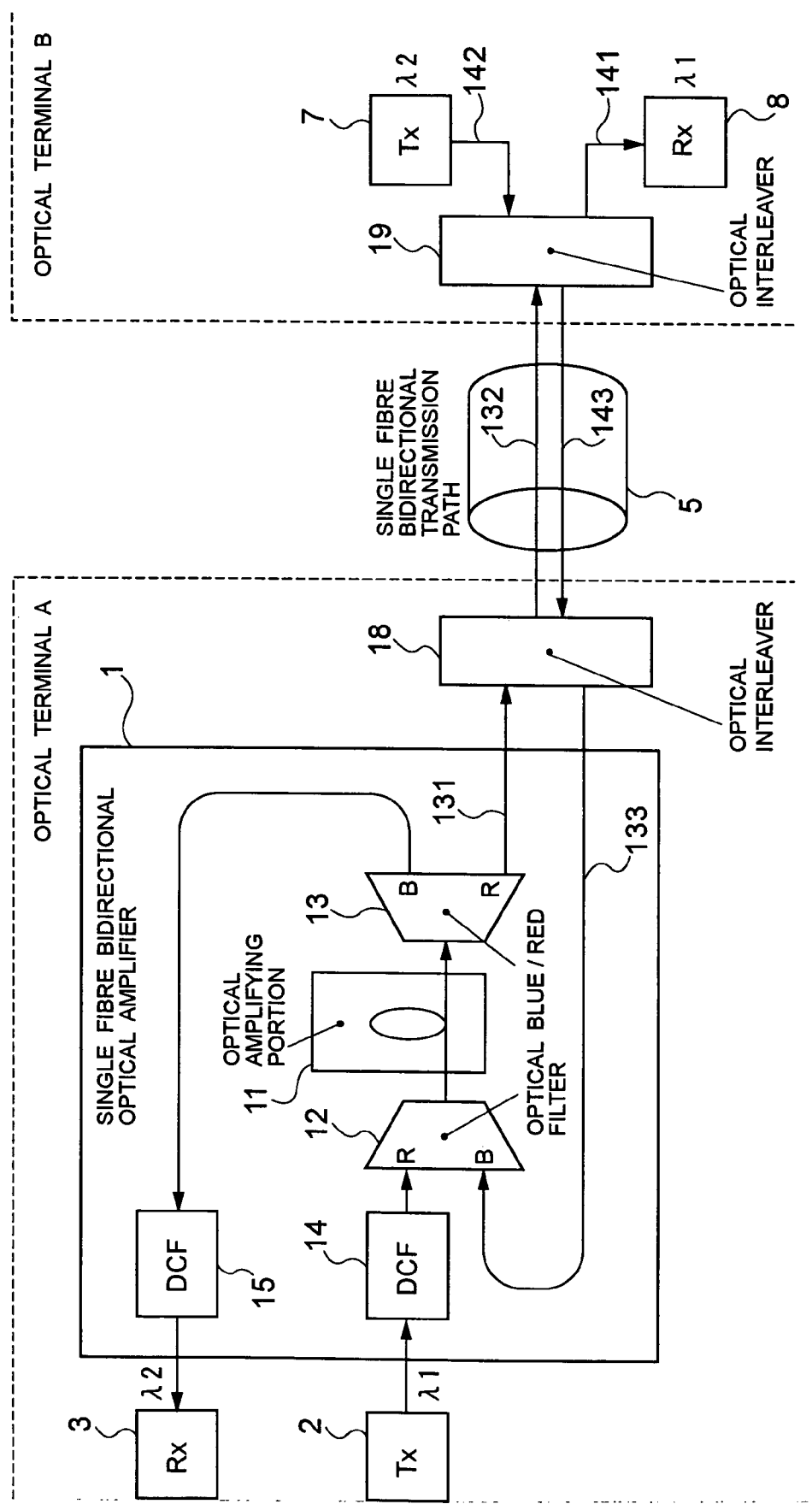
FIG. 6 is a block diagram showing the configuration of a single fibre bidirectional optical transmission system according to a third embodiment of the present invention.

FIG. 6 is a block diagram showing the configuration of a single fibre bidirectional optical transmission system according to a third embodiment of the present invention. In FIG. 6, the single fibre bidirectional optical transmission system according to the third embodiment of the present invention has the same configuration as that of the first embodiment of the present invention as shown in FIG. 1 except that the system is configured such that the optical circulators 4 and 6 are replaced by the optical interleavers 18 and 19, thereby multiplexing and demultiplexing the up and down optical signal. Further, the operation of same component is the same as that of the first embodiment of the present invention.

Figure 7:
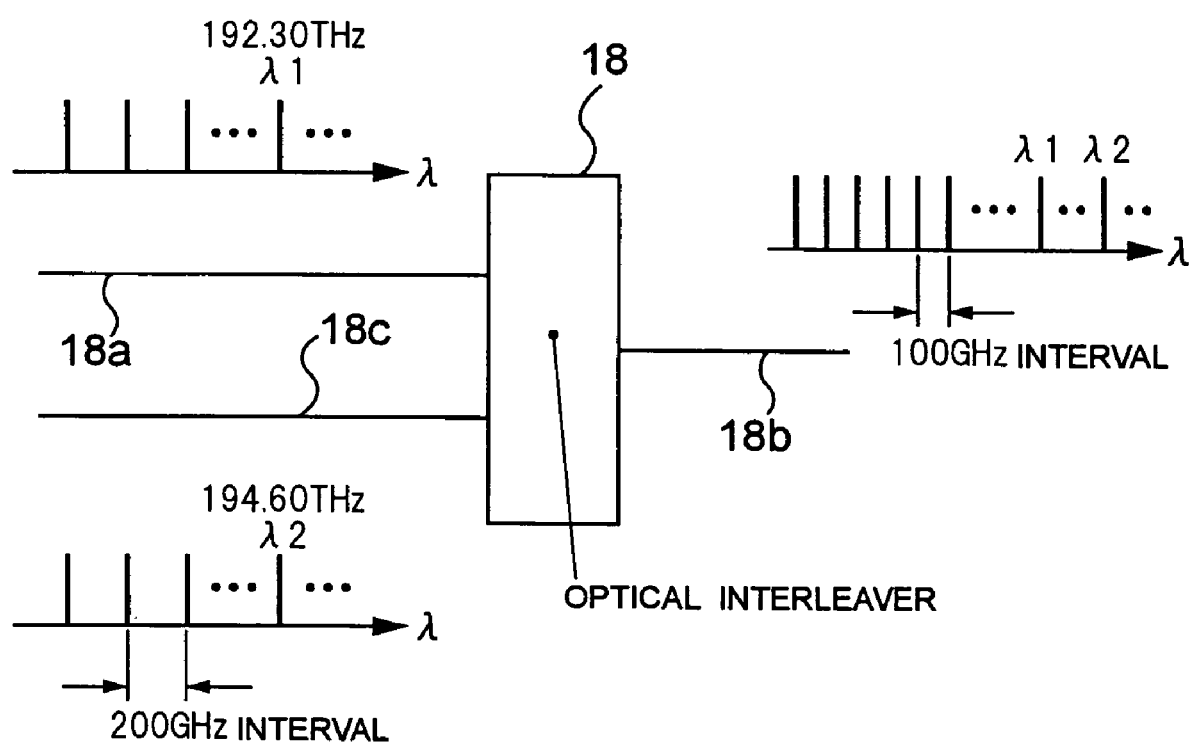
FIG. 7 is a view showing an optical interleaver of FIG. 6.

FIG. 7 is a view showing the optical interleaver 18 of FIG. 6. In FIG. 7, multiple signals having 100 GHz in wavelength interval in the port 18b are demultiplexed into even number channels and odd number channels at intervals of 200 GHz in wavelength for a port 18a and a port 18c through the optical inverleaver 18.

In contrast, the multiple signals at intervals of 200 GHz inputted from the port 18a and the port 18c are multiplexed into the multiple signals at intervals of 100 GHz at the port 18b through the optical interleaver 18. Since the frequency of the wavelength λ1=1558.98 and λ2=1540.56 is 192.30 THz and 194.60 THz, respectively, λ1 transmits the port 18a of the optical interleaver 18, and λ2 transmits the port 18b of the optical interleaver 18, respectively.

Since the loss of the optical interleaver 18 is 1 dB, the optical signal power of the wavelength λ1 and the wavelength λ2 input to the optical amplifying portion 11 becomes −16 dB and −28 dB, respectively, and similarly with the above described first embodiment of the present invention, it is in the range where the optical amplifying portion 11 linearly operates. In this way, in the present embodiment, by using the single fibre bidirectional optical amplifier 1, the single fibre bidirectional transmission of 10 Gbps and 80 km can be realized. Although not illustrated, the same is applied to an optical interleaver 19 similarly with the optical interleaver 18.

Figure 8:
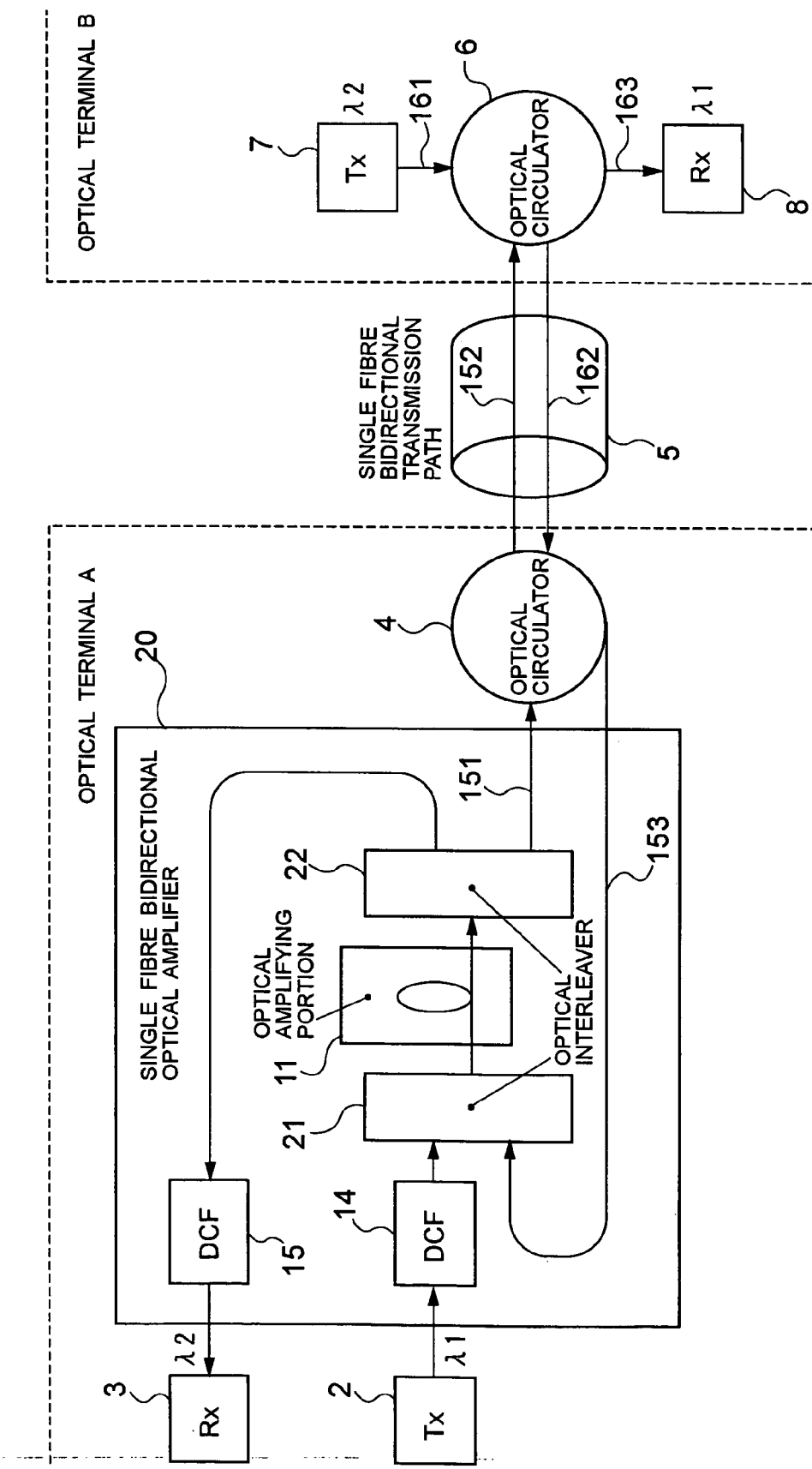
FIG. 8 is a block diagram showing the configuration of a single fibre bidirectional optical transmission system according to a fourth embodiment of the present invention.

FIG. 8 is a block diagram showing the configuration of a single fibre bidirectional optical transmission system according to a fourth embodiment of the present invention. In FIG. 8, the single fibre bidirectional optical transmission system according to the fourth embodiment of the present invention has the same configuration as that of the first embodiment as shown in FIG. 1 except that the system is configured such that the optical Blue/Red filters 12 and 13 are replaced by optical interleavers 21 and 22, thereby performing the multiplexing and demultiplexing. Further, the operation of the same component is the same as that of the first embodiment of the present invention.

The optical interleavers 21 and 22 have the same characteristics as that of the optical interleavers 18 and 19 in the above-described third embodiment of the present invention. In this way, in the present embodiment, similarly with the above-described first embodiment of the present invention, by using a single fibre bidirectional amplifier 20, the single fibre bidirectional transmission of 10 Gbps and 80 km can be realized.

At this time, the present embodiment can be executed by replacing the optical circulators 21 and 22 by the optical Blue/Red filters similarly with the above-described second embodiment of the present invention. Further, the present embodiment can be realized by taking the optical circulators 4 and 6 as the optical interleavers similarly with the above-described third embodiment of the present invention.

Figure 9:
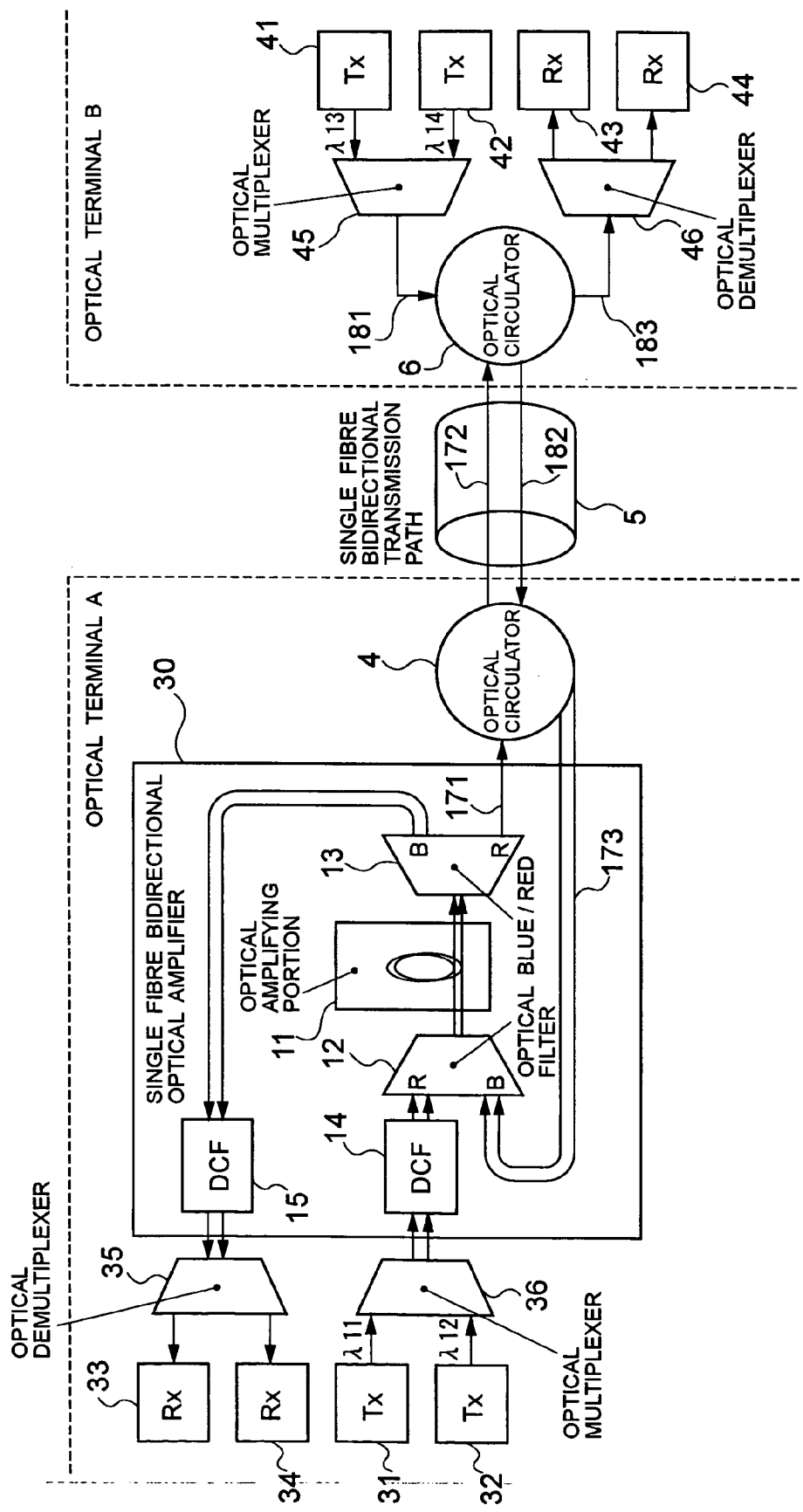
FIG. 9 is a block diagram showing the configuration of a single fibre bidirectional optical transmission system according to a fifth embodiment of the present invention.

FIG. 9 is a block diagram showing the configuration of a single fibre bidirectional optical transmission system according to a fifth embodiment of the present invention. In FIG. 9, the single fibre bidirectional optical transmission system according to the fifth embodiment of the present invention is configured such that, by using optical multiplexer 36 and 45 and optical demultiplexer 35 and 46 of a plurality of channels, the multiplexing and demultiplexing are performed, thereby performing a WDM transmission of a plurality of single directional channels.

The present embodiment is configured to perform the bidirectional transmission of two waves per direction and a total of two x two wavelengths. The wavelength of the optical signal from each optical transmitter 31, 32, 41 and 42 is λ11=1558.98 nm, λ12=1557.36 nm, λ13=1540.56 nm, and λ14=1538.98 nm, and an optical output power is −1 dBm, respectively.

Figure 10:
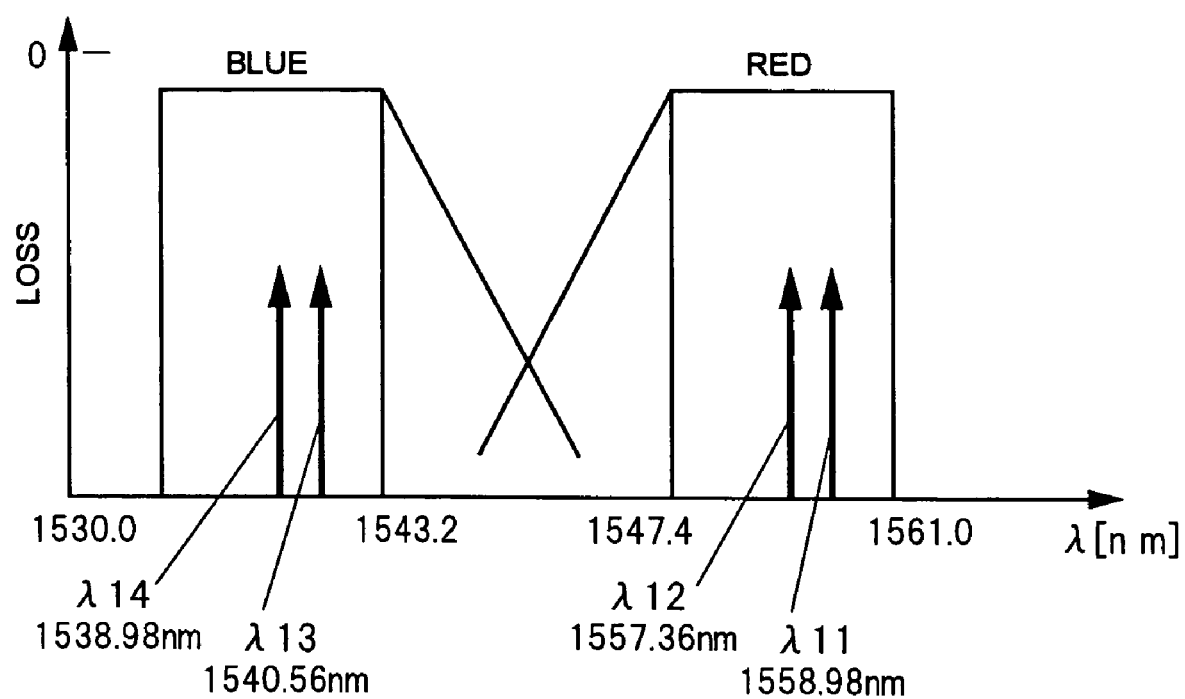
FIG. 10 is a view showing the characteristic and the wavelength arrangement of the optical Blue/Red filter.
Figure 11:
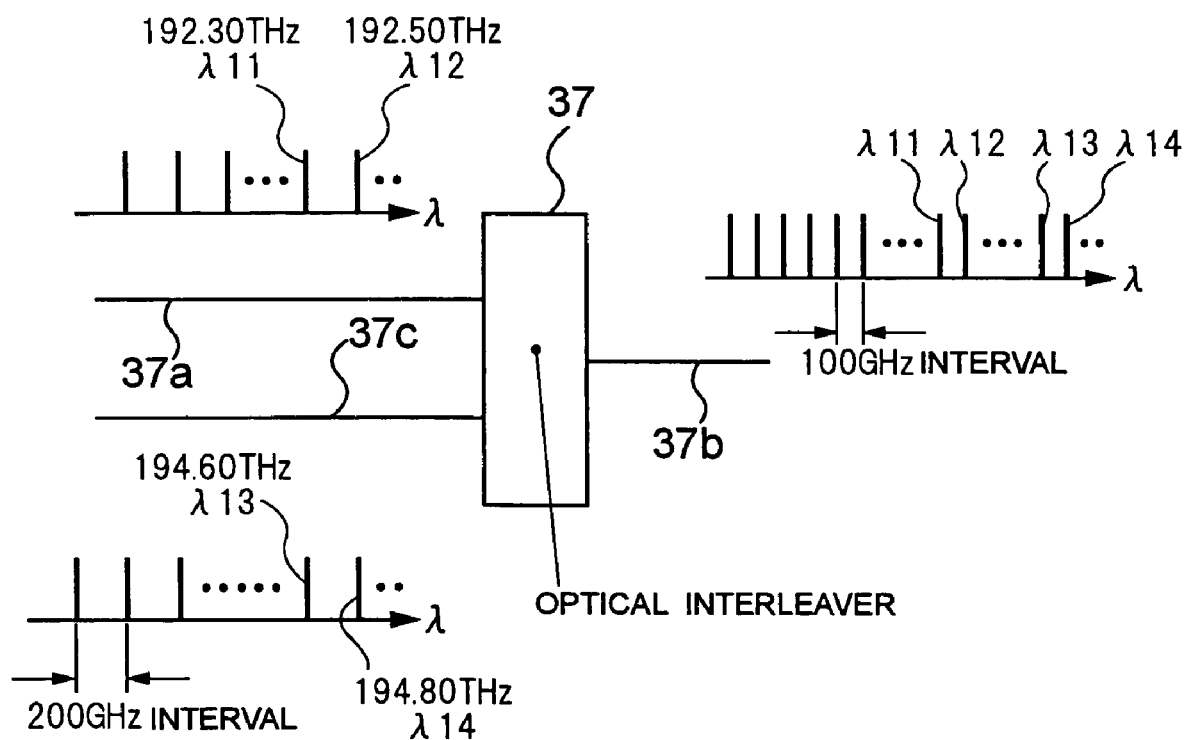
FIG. 11 is a view showing the configuration and the wavelength arrangement of the optical interleaver.

FIG. 10 is a view showing a characteristic and a wavelength arrangement of the optical Blue/Red filter, and FIG. 11 is a view showing the configuration and the wave arrangement of the optical interleaver. In FIG. 10, the relationship between the wavelength arrangement of the signal beams λ11 to λ14 and the bands of the optical Blue/Red filters 12 and 13 is shown.

The pass band bandwidth of the Blue band and the Red band is the same as that of the above-described first embodiment of the present invention. The optical signals of the wavelengths λ11 and λ12 transmit the Red band only, and the optical signals of the wavelengths of λ13 and λ14 transmit the Blue band only. Hence, the optical signals of the wavelengths λ11 and λ12 and the optical signals of the wavelengths λ13 and λ14 are multiplexed and demultiplexed by the wavelengths.

Assuming that the loss of the optical multiplexer 36 and 45 and the optical demultiplexer 35 and 46 is taken as 3 dB, and the single fibre bidirectional transmission path 5 is taken as 80 km with its loss as 20 dB, the power which is inputted to the optical amplifying portion 11 is −15 dBm per channel for the wavelengths λ11 and λ12, and −27 dBm per channel for the wavelengths λ13 and λ14, and the difference in the power level of the input optical signals is 12 dB, and it is, therefore, in the range where the optical amplifying portion 11 linearly operates similarly with the above-described first embodiment of the present invention.

Further, since the gain is 25 dB, the optical power at the optical receivers 33, 34, 43 and 44 becomes −16 dBm, and it is on a receivable level. In this way, in the present embodiment, by using a single fibre bidirectional optical amplifier 30, a four channel single fibre bidirectional transmission of 10 Gbps and 80 km can be realized.

At this time, in the present embodiment, similarly with the above-described second embodiment of the present invention, the optical circulators 4 and 6 can use the optical Blue/Red filter having the same band as the optical Blue/Red filters 12 and 13.

Further, the frequency of each signal from the wavelength λ11 to the wavelength λ14 is 192.30 THz, 192.50 THz, 194.60 THz and 194.40 THz, respectively. As the frequency arrangement of the signal beams λ11 to λ14 is shown in FIG. 11, since the wavelengths λ11 and λ12, and the wavelengths λ13 and λ14 can be divided into separate ports by the optical interleaver 37, the optical circulators 4 and 6 can be realized even by the optical interleavers similarly with the above-described third embodiment of the present invention. Further, in the present embodiment, similarly with the above-described fourth embodiment of the present invention, the optical Blue/Red filters 12 and 13 within the single fibre bidirectional amplifier 30 may be the optical interleavers.

Figure 12:
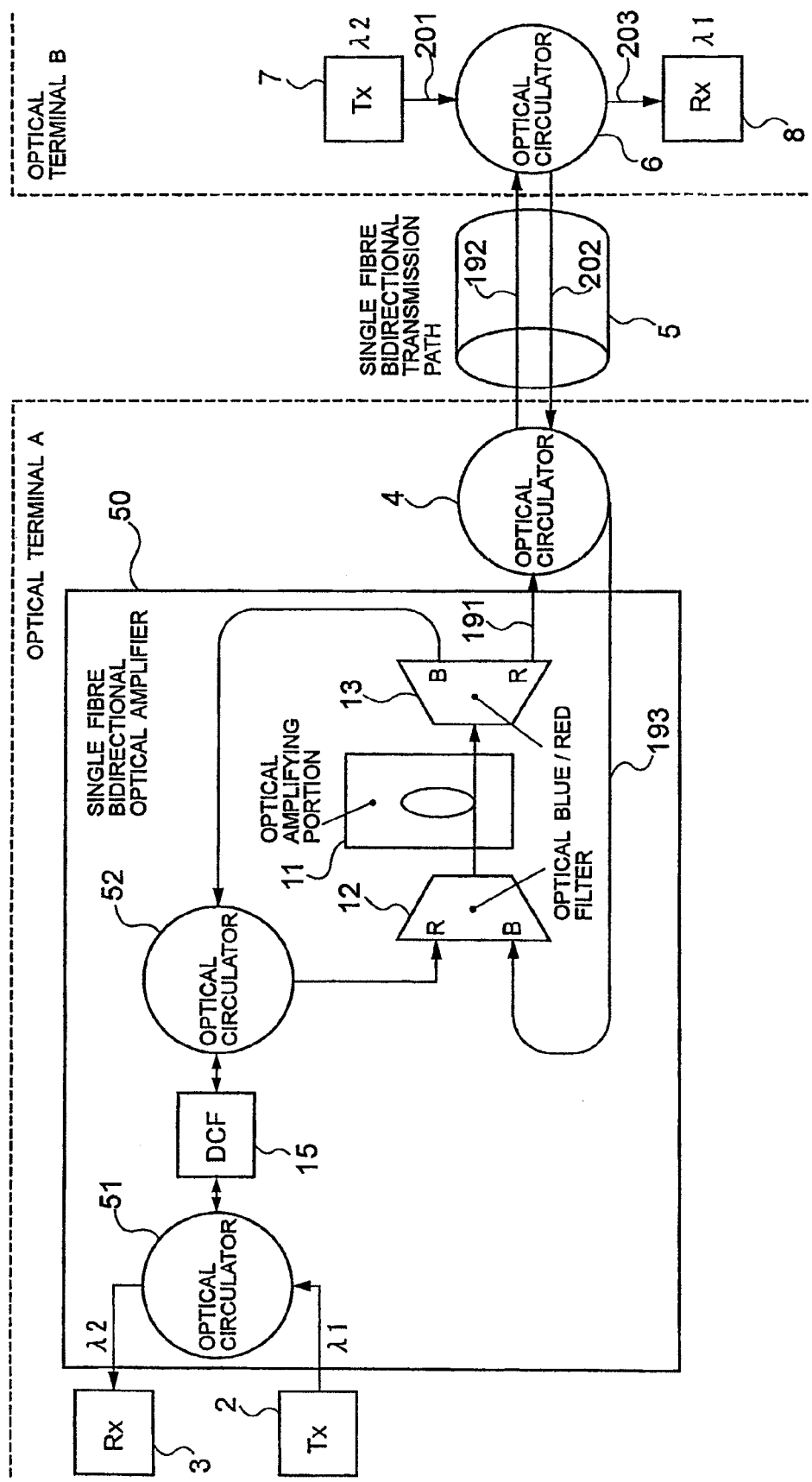
FIG. 12 is a block diagram showing the configuration of a single fibre bidirectional optical transmission system according to a sixth embodiment of the present invention.

FIG. 12 is a block diagram showing the configuration of a single fibre bidirectional optical transmission system according to a sixth embodiment of the present invention. In FIG. 12, the single fibre bidirectional optical transmission system according to the sixth embodiment of the present invention installs optical circulators 51 and 52 before and after a dispersion compensator 15, and multiplexes and demultiplexes the up and down optical signals before and after the dispersion compensator 15, and performs a bidirectional collective dispersion compensation on a dispersion compensation fibre, thereby configuring a single fibre bidirectional optical amplifier 50 by a dispersion compensator 15 instead of two sets of the dispersion compensators 14 and 15 used in the above-described first to fifth embodiments of the present invention.

The output wavelengths of the first optical transmitter 2 and the second optical transmitter 7, similarly with the above-described first embodiment of the present invention, are λ1=1558.98 nm and λ2=1540.56 nm. The amount of dispersion compensation of the dispersion compensator 15, similarly with the above-described first embodiment of the present invention, is −1360 ps/nm, and its loss is 10 dB.

Assuming that the output of the first optical transmitter 2 and the second optical transmitter 7 is taken as −5 dBm, the optical power of the wavelengths λ1 and λ2 inputted to the optical amplifying portion 11 is −18 dBm and −28 dBm, respectively, and similarly with the above-described first embodiment of the present invention, it is in the range where the optical amplifier portion 11 linearly operates. Further, the power at the first optical receiver 3 and the second optical receiver 8 becomes −16 dBm, and is on a receivable level. In this way, in the present embodiment, by using a single fibre bidirectional optical amplifier 50, the single fibre bidirectional transmission of 10 GBps and 80 km can be realized.

Even here, the optical circulators 4, 6, 51 and 52, similarly with the above-described second and third embodiments of the present invention, can use the optical Blue/Red filters and optical interleavers having the same bands as those of the optical Blue/Red filters 12 and 13.

Further, in the present embodiment, similarly with the above-described fourth embodiment of the present invention, the optical Blue/Red filters 12 and 13 within the single fibre bidirectional optical amplifier 50 may be optical interleavers. Further, in the present embodiment, similarly with the above-described fifth embodiment of the present invention, by using the optical multiplexer and the optical demultiplexer, it is possible to perform the WDM transmission of a plurality of single directional channels.

Figure 13:
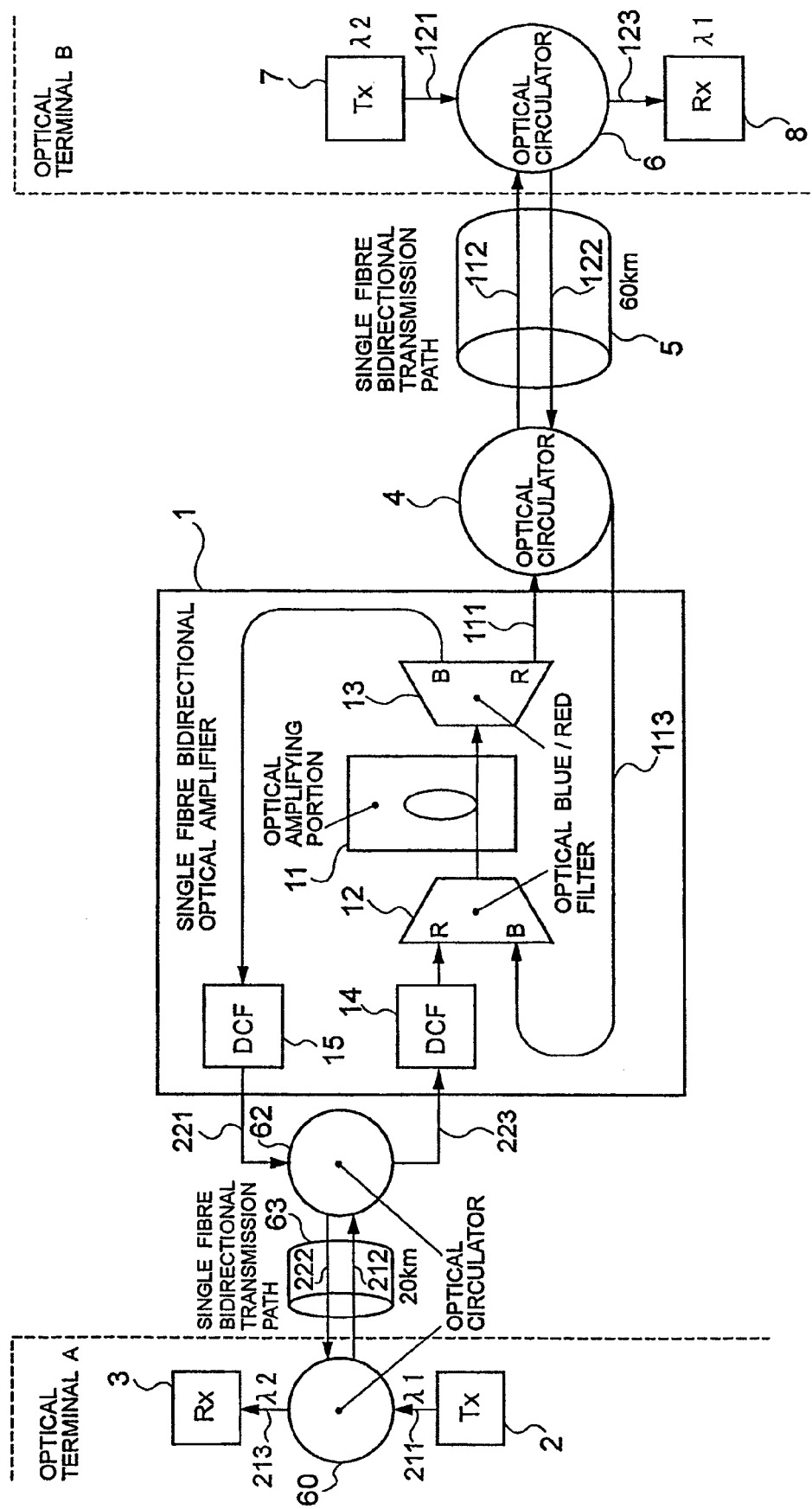
FIG. 13 is a block diagram showing the configuration of a single fibre bidirectional optical transmission system according to a seventh embodiment of the present invention.

FIG. 13 is a block diagram showing the configuration of a single fibre bidirectional optical transmission system according to a seventh embodiment of the present invention. In FIG. 13, the single fibre bidirectional optical transmission system according to the seventh embodiment of the present invention is configured such that a single fibre bidirectional optical amplifier 1 is inserted in the middle of the transmission path.

By installing optical circulators 4, 61 and 62 before and after the single fibre bidirectional optical amplifier 1, the amplifier 1 can be inserted not only in the terminal office of the transmission path in the above-described first to six embodiments of the present invention, but also in the middle of the transmission path.

The output wavelengths of the first optical transmitter 2 and the second optical transmitter 7, similarly with the above-described first embodiment of the present invention, are λ1=1558.98 nm and λ2=1540.56 nm. The amount of the dispersion compensation of the dispersion compensators 14 and 15, similarly with the above-described first embodiment of the present invention, is −1360 ps/nm, and its loss is 10 dB.

In the present embodiment, the distance from the single fibre bidirectional optical amplifier 1 to an optical terminal A and an optical terminal B is taken as 20 km and 60 km, respectively, and the loss at this time of the single fibre bidirectional transmission paths 5 and 63 is taken as 5 dB and 15 dB, respectively.

Assuming that the output of the first optical transmitter 2 and the second optical transmitter 7 is −5 dBm, the light signal power of the wavelengths λ1 and λ2 inputted to an optical amplifying portion 11 becomes −23 dBm and −23 dBm, respectively, and similarly with the above-described first embodiment of the present invention, it is in the range where the optical amplifying portion 11 linearly operates. Further, the optical power at the first optical receiver 3 and the second optical receiver 8 becomes −16 dBm, and is on a receivable level. In this way, in the present embodiment, the single fibre bidirectional transmission of 10 Gbps and 80 km can be realized without limiting an installing place of the single fibre bidirectional optical amplifier 1 to the center of the transmission path.

At this time, in the present embodiment, similarly with the above-described second and third embodiments of the present invention, the optical Blue/Red filters and the Optical interleavers can be used instead of the optical circulators 4, 6, 61 and 62.

Further, in the present embodiment, similarly with the above-described fourth embodiment of the present invention, the optical Blue/Red filters 12 and 13 within the single fibre bidirectional optical amplifier 1 may be taken as the optical interleavers. Further, in the present embodiment, similarly with the above-described fifth embodiment of the present invention, by using the optical multiplexer and the optical demultiplexer, it is possible to perform the WDM transmission of a plurality of single directional channels.

Figure 14:
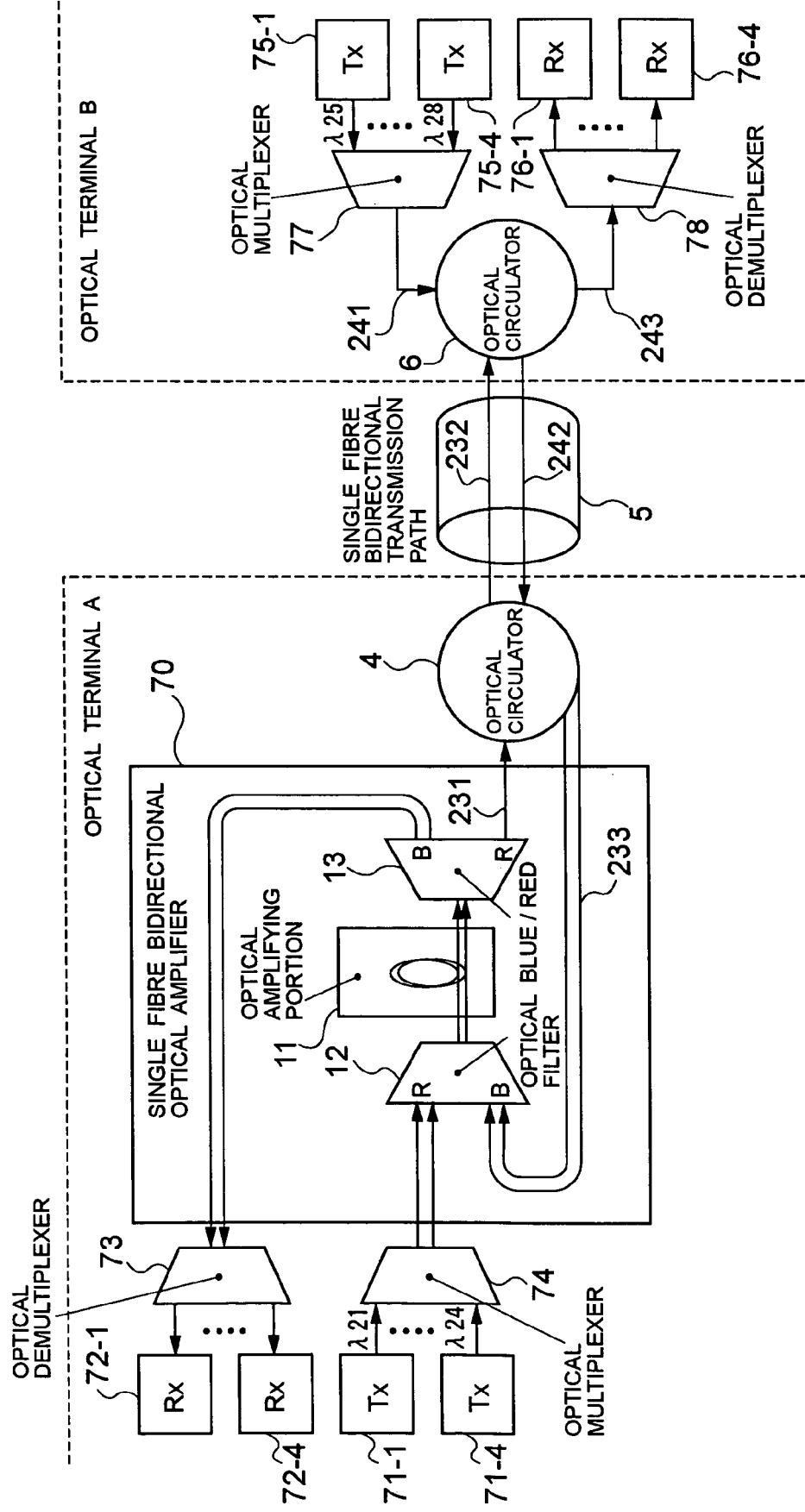
FIG. 14 is a block diagram showing the configuration of a single fibre bidirectional optical transmission system according to an eighth embodiment of the present invention.

FIG. 14 is a block diagram showing the configuration of a single fibre bidirectional optical transmission system according to an eighth embodiment of the present invention. In FIG. 14, the single fibre bidirectional optical transmission system according to the eighth embodiment of the present invention is configured such that the single fibre bidirectional optical amplifier 70 comprises the optical amplifying portion 11 and the optical Blue/Red filters 12 and 13 placed before and after the amplifier, and since the transmission distance is short, a dispersion compensator is not used.

In the present embodiment, the transmission distance is taken as 60 km, and its loss is taken as 15 dB, and the system is configured such that the bidirectional transmission of four waves/direction and a total of four x two wavelengths is performed. For an optical multiplexer 74, a low priced coupler is used, and its loss is 9 dB, and the loss of an optical multiplexer 77 and optical demultiplexers 73 and 78 is 5 dB, respectively.

The wavelength of the optical signal from each optical transmitter 71-1 to 71-4 and 75-1 to 75-4 is $\lambda 21$=1558.98 nm, $\lambda 22$=1557.36 nm, $\lambda 23$=1555.75 nm, $\lambda 24$=1554.13, $\lambda 25$=1540.56 nm, $\lambda 26$=1538.98 nm, $\lambda 27$=1537.40 nm, and $\lambda 28$=1535.82 nm, and the optical output power is −5 dBm.

Figure 15:
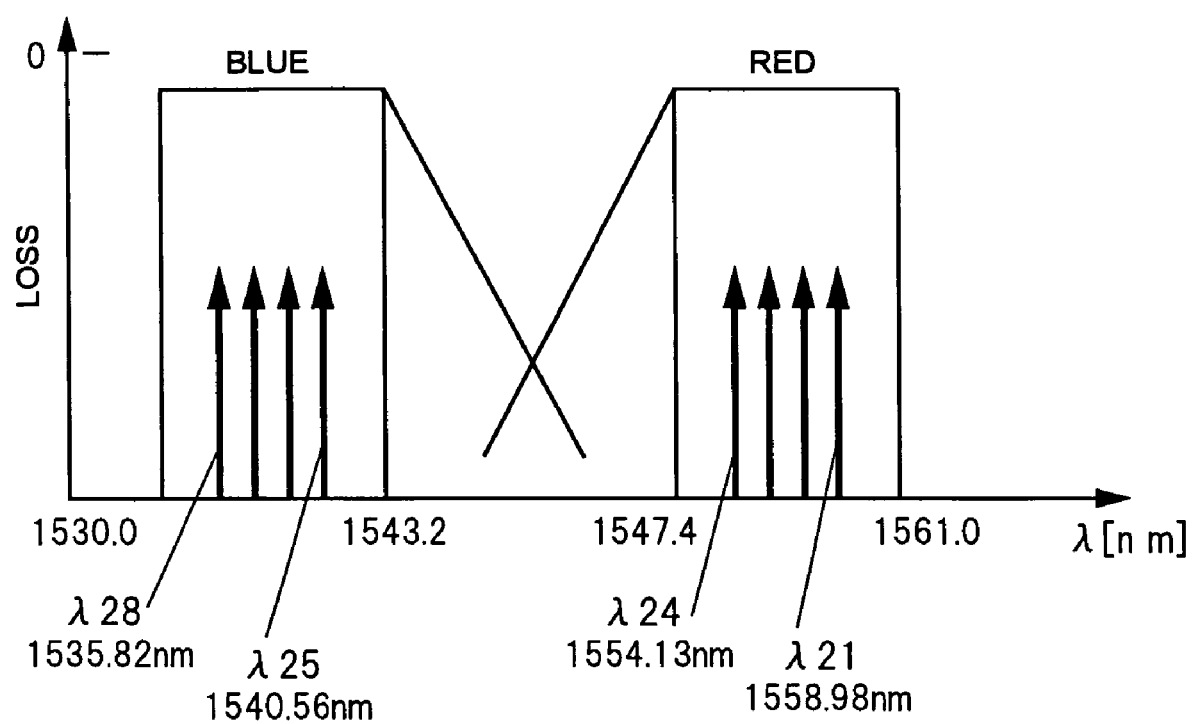
FIG. 15 is a view showing the characteristic and the wavelength arrangement of the optical Blue/Red filter.
Figure 16:
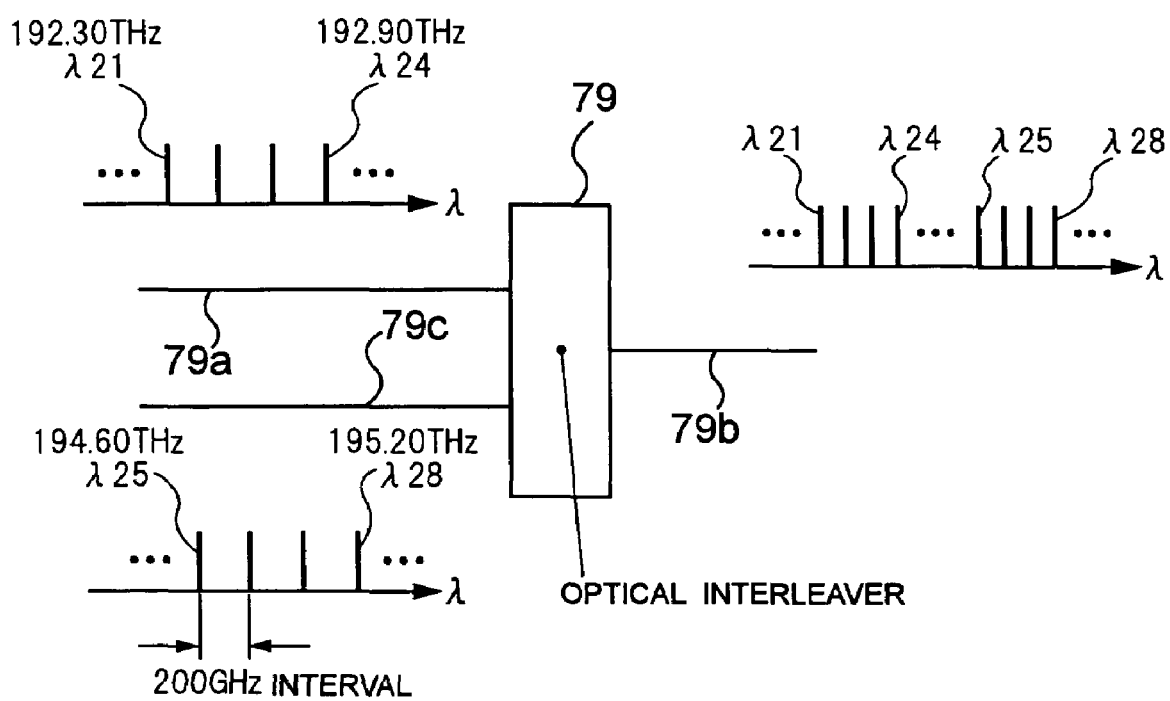
FIG. 16 is a view showing the configuration and the wavelength arrangement of the optical interleaver.
Figure 17:
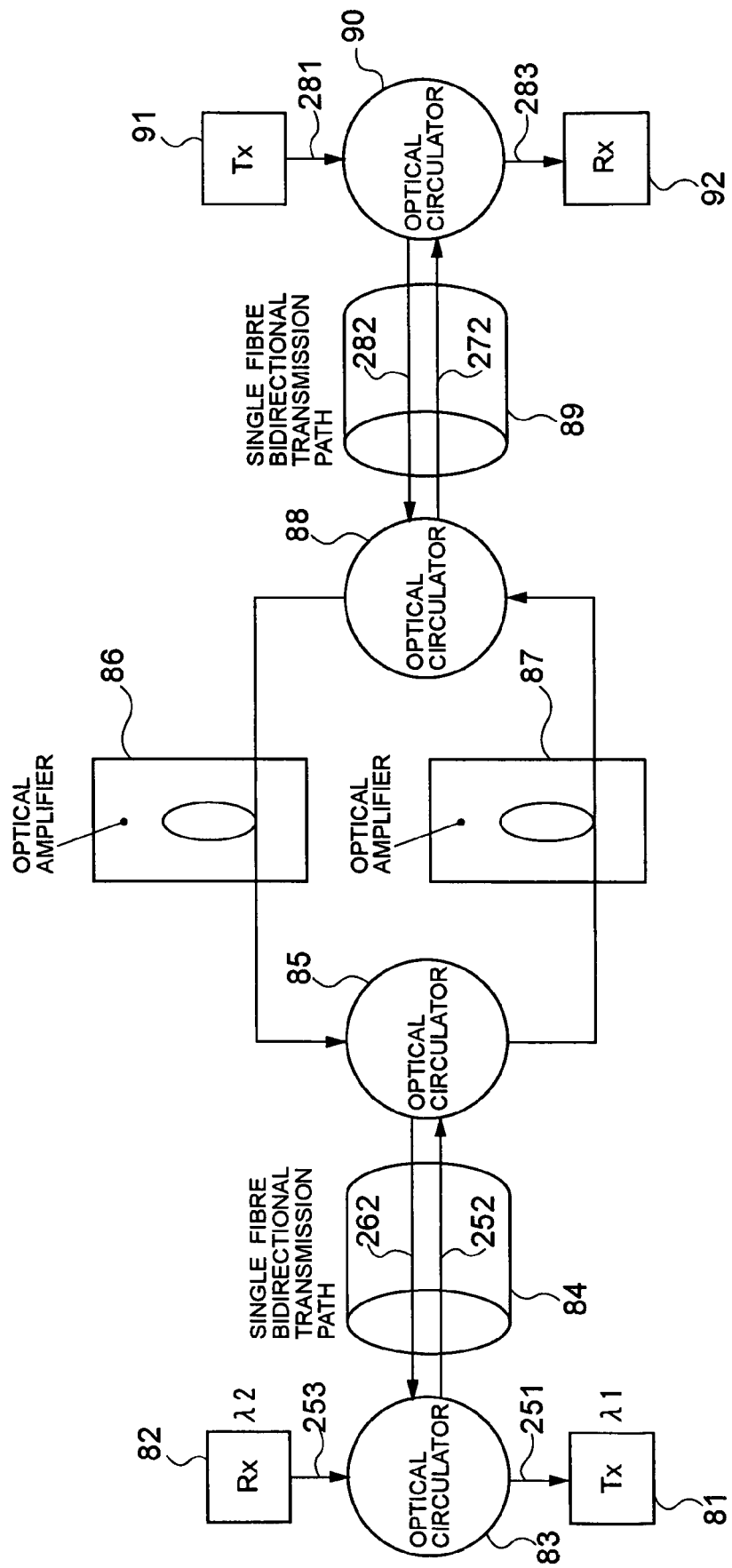
FIG. 17 is a view showing a conventional single fibre bidirectional optical transmission system.

FIG. 15 is a view showing the characteristic and the wavelength arrangement of the optical Blue/Red filter, and FIG. 16 is a view showing the configuration and the wavelength arrangement of the optical interleaver. FIG. 15 shows a relationship between the wavelength arrangement of the signal beams $\lambda 21$ to $\lambda 28$ and the bands of the optical Blue/Red filters 12 and 13.

The pass band bandwidth of the Blue band and the Red band is the same as that of the above-described first embodiment of the present invention. The optical signals of the wavelengths $\lambda 21$ to $\lambda 24$ transmit the Red band only, and the optical signals of the wavelengths $\lambda 25$ to $\lambda 28$ transmits the Blue band only. Hence, the optical signals of the wavelengths $\lambda 21$ to $\lambda 24$ and the wavelengths $\lambda 25$ to $\lambda 28$ are multiplexed and demultiplexed by the wavelength.

The powers of the wavelengths $\lambda 21$ to $\lambda 24$ and $\lambda 25$ to $\lambda 28$ inputted to the optical amplifying portion 11 is −15 dBm and −28 dBm per channel, respectively, and since the difference in power level between the input signal and the powers is 13 dB, similarly with the above-described first embodiment of the present invention, it is in the range where the optical amplifying portion 11 linearly operates.

Further, since the gain is 25 dB, the optical powers at optical receivers 72-1 to 72-4 and 76-1 to 76-4 become −8 dBm and −13 dBm, and are on a receivable level. In this way, in the present embodiment, by using a single fibre bidirectional optical amplifier 70, an eight channel single fibre bidirectional transmission of 10 Gbps and 60 km can be realized.

At this time, in the present embodiment, similarly with the above-described second embodiment of the present invention, the optical circulators 4 and 6 maybe the optical Blue/Red filters having the same bands as those of the optical Blue/Red filters 12 and 13.

Further, in the present embodiment, the frequency of each signal from the wavelengths $\lambda 21$ to $\lambda 28$ is 192.30 THz, 192.50 THz, 192.70 THz, 192.90 THz, 194.60 THz, 194.80 THz, 195.00 THz, and 195.20 THz, respectively. The frequency arrangement of the signal beams $\lambda 21$ to $\lambda 28$ can be divided into separate ports for the wavelengths $\lambda 21$ to $\lambda 24$ and the wavelengths $\lambda 25$ to $\lambda 28$ by the optical interleaver 79 shown in FIG. 16, and therefore, similarly with the above-described third embodiment of the present invention, the optical Blue/Red filters 12 and 13 and the optical circulators 4 and 6 can be realized even by the optical interleaver. Further, similarly with the above-described fourth embodiment of the present invention, the optical Blue/Red filters 12 and 13 within the single fibre bidirectional optical amplifier 70 may be the optical interleaver.

In the above-described explanation, though the optical amplifying portion 11 is taken as the erbium doped fibre amplifying portion, this may be an optical amplifying portion or a semiconductor optical amplifying portion using a fibre added with other rare earths depending on the wavelength of the optical signal to be amplified.

Further, the optical Blue/Red filter is also taken as a C-band optical Blue/Red filter, but this may be a filter used in other band depending on the range of the wavelength in use.

Further, in the configuration of the present invention, the element depending on the transmission speed is not used, and, for example, the transmission speed may be 2.4 Gbps or 10 Gpbs. In this way, in the above-described configuration, as far as the above-described function is satisfied, optical signal wavelength, transmission speed, and transmission distance are unrestricted, and the above-described explanation does not limit the present invention.

In this way, the single fibre bidirectional optical amplifier of the present invention can be realized at a moderate price. Since, in the single fibre bidirectional transmission path 5 for transmitting bidirectional on a single conductor fibre, the optical amplifier 11 is inserted in either one end only of the transmission path, and the up and down bidirectional optical signals can be collectively amplified by one optical amplifier 11, the extension of the single fibre bidirectional long distance can be realized at a moderate price. Further, since the single fibre bidirectional optical amplifier of the present invention can be realized by a simple configuration of adding only passive parts to the ordinary optical amplifier, it can be manufactured at a moderate price.

As described above, the present invention has the advantage of realizing the extension of the single fibre bidirectional long distance at a moderate price by the above-described configuration and processing operations.

What is claimed is:

1. A single fibre bidirectional optical transmission system performing bidirectional transmission between a first optical terminal and a second optical terminal through a single bidirectional transmission path, wherein an optical amplifier is provided in either said first optical terminal or said second optical terminal, wherein said optical amplifier comprises:

an optical amplifying portion;

an optical multiplexer;

an optical demultiplexer; and a first optical dispersion compensator,
wherein said optical multiplexer and said optical demultiplexer are provided on opposing sides of said optical amplifying portion,
wherein said first optical dispersion compensator is provided between said optical amplifying portion and an optical transmitter,
wherein said optical transmitter is either one of a first optical transmitter connected to said first optical terminal or a second optical transmitter connected to said second optical terminal,
wherein said optical amplifier is configured to collectively amplify bidirectional wavelength multiplexing optical signals,
wherein said first optical dispersion compensator is configured to adjust a difference between a first power level, at which a first optical signal from said first optical transmitter is inputted to said optical amplifying portion, and a second power level, at which a second optical signal from said second optical transmitter is inputted to said optical amplifying portion, such that said difference is small.

2. The single fibre bidirectional optical transmission system according to claim 1, wherein said first optical terminal and said second optical terminal include a directional separator by which said wavelength multiplexing lights transmitting through said single fibre bidirectional transmission path are separated for every direction.

3. The single fibre bidirectional optical transmission system according to claim 2, wherein said directional separator comprises at least one of an optical circulator, an optical Blue/Red filter and an optical interleaver.

4. The single fibre bidirectional optical transmission system according to claim 1, wherein said optical amplifier comprises:
a second optical dispersion compensator,
wherein said optical multiplexer and said first optical dispersion compensator are placed at an input side of said optical amplifying portion,
wherein said optical demultiplexer and said second optical dispersion compensator are placed at an output side of said optical amplifying portion,
wherein said first optical dispersion compensator is connected to an optical transmitter in either one of said first and said second optical terminals equipped with said optical amplifier,
wherein said first optical dispersion compensator is connected to said optical multiplexer,
wherein said second optical dispersion compensator is connected to an optical receiver in either one of said first and said second optical terminals equipped with said optical amplifier,
wherein said second optical dispersion compensator is connected to said optical demultiplexer, and
wherein an optical signal outputted from said optical transmitter and having passed through said first optical dispersion compensator, and an optical signal having propagated through said single fibre bidirectional transmission path, are multiplexed and collectively amplified, and thereafter, are demultiplexed into a signal to be outputted to said optical receiver through said second dispersion compensator and a signal to be outputted to said single fibre bidirectional transmission path.

5. The single fibre bidirectional optical transmission system according to claim 4, wherein said optical multiplexer and said optical demultiplexer comprise at least one of an optical Blue/Red filter and an optical interleaver.

6. The single fibre bidirectional optical transmission system according to claim 1, wherein said optical multiplexer is placed at an input side of said optical amplifying portion,
wherein said optical demultiplexer is placed at an output side of said optical amplifying portion,
wherein optical directional separators are placed at both ends of said first optical dispersion compensator, and
wherein an optical signal outputted from an optical transmitter in either of said first and said second optical terminals equipped with said optical amplifier, and an optical signal having propagated through said single fibre bidirectional transmission path, are multiplexed and collectively dispersion-compensated and collectively amplified, and thereafter, are demultiplexed, and then, are outputted to an optical receiver in either of said first and said second optical terminals equipped with said optical amplifier and to said single fibre bidirectional transmission path.

7. The single fibre bidirectional optical transmission system according to claim 6, wherein said optical multiplexer and said optical demultiplexer comprise at least one of an optical Blue/Red filter and an optical interleaver.

8. The single fibre bidirectional optical transmission system according to claim 6, wherein said optical directional separators comprise at least one of an optical circulator, an optical Blue/Red filter and an optical interleaver.

9. A single fibre bidirectional optical amplifier comprising:
an optical amplifying portion;
an optical multiplexer;
an optical demultiplexer; and
a first optical dispersion compensator,
wherein said optical amplifier is provided in either a first optical terminal or a second optical terminal,
wherein said optical multiplexer and said optical demultiplexer are provided on opposing sides of said optical amplifying portion,
wherein said first optical dispersion compensator is provided between said optical amplifying portion and an optical transmitter,
wherein said optical transmitter is either one of a first optical transmitter connected to said first optical terminal or a second optical transmitter connected to said second optical terminal,
wherein said first optical terminal and said second optical terminal are configured to perform bidirectional transmission between said first optical terminal and said second optical terminal through a single bidirectional transmission path,
wherein said optical amplifier is configured to collectively amplify bidirectional wavelength multiplexing optical signals,
wherein said first optical dispersion compensator is configured to adjust a difference between a first power level, at which a first optical signal from said first optical transmitter is inputted to said optical amplifying portion, and a second power level, at which a second optical signal from said second optical transmitter is inputted to said optical amplifying portion, such that said difference is small.

10. The single fibre bidirectional optical amplifier according to claim 9, wherein said first optical terminal and said second optical terminal include a directional separator, which separates said wavelength multiplexing lights transmitting through said single fibre bidirectional transmission path for every direction.

11. The single fibre bidirectional optical amplifier according to claim 10, wherein said directional separator comprises at least one of an optical circulator, an optical Blue/Red filter, and an optical interleaver.

12. The single fibre bidirectional optical amplifier according to claim 9, wherein said optical amplifier comprises:
a second optical dispersion compensator,
wherein said optical multiplexer and said first optical dispersion compensator are placed at an input side of said optical amplifying portion,
wherein said optical demultiplexer and said second optical dispersion compensator are placed at an output side of said optical amplifying portion,
wherein said first optical dispersion compensator is connected to an optical transmitter in either one of said first and said second optical terminals equipped with said optical amplifier,
wherein said first optical dispersion compensator is connected to said optical multiplexer,
wherein said second optical dispersion compensator is connected to an optical receiver in either one of said first and said second optical terminals equipped with said optical amplifier,
wherein said second optical dispersion compensator is connected to said optical demultiplexer, and
wherein an optical signal outputted from said optical transmitter and having passed through said first dispersion compensator, and an optical signal having propagated through said single fibre bidirectional transmission path, are multiplexed and collectively amplified, and thereafter, are demultiplexed into the signal to be outputted to said optical receiver through said second dispersion compensator and a signal to be outputted to said single fibre bidirectional transmission path.

13. The single fibre bidirectional optical amplifier according to claim 12, wherein said optical multiplexer and said optical demultiplexer comprise at least one of an optical Blue/Red filter and an optical interleaver.

14. The single fibre bidirectional optical amplifier according to claim 9, wherein said optical multiplexer is placed at an input side of said optical amplifying portion,
wherein said optical demultiplexer is placed at an output side of said optical amplifying portion; and
wherein optical directional separators are placed at both ends of said first optical dispersion compensator, and
wherein an optical signal outputted from an optical transmitter in either of said first and said second optical terminals equipped with said optical amplifier, and an optical signal having propagated through said single fibre bidirectional transmission path, are multiplexed and collectively dispersion-compensated and collectively amplified, and thereafter, are demultiplexed, and then, are outputted to an optical receiver in either of said first and said second optical terminals equipped with the said optical amplifier and to said single fibre bidirectional transmission path.

15. The single fibre bidirectional optical amplifier according to claim 14, wherein said optical multiplexer and said optical demultiplexer comprise at least one of an optical Blue/Red filter and an optical interleaver.

16. The single fibre bidirectional optical amplifier according to claim 14, wherein said optical directional separators comprise at least one of an optical circulator, an optical Blue/Red filter, and an optical interleaver.

* * * * *